United States Patent
Shimamoto et al.

(10) Patent No.: US 9,359,661 B2
(45) Date of Patent: Jun. 7, 2016

(54) BEARING STEEL MATERIAL WITH EXCELLENT ROLLING FATIGUE PROPERTY AND BEARING PART

(71) Applicant: Kobe Steel, Ltd., Kobe-shi (JP)

(72) Inventors: Masaki Shimamoto, Kobe (JP); Yosuke Shindo, Kobe (JP); Masaki Kaizuka, Kobe (JP); Akihiro Owaki, Kobe (JP); Sei Kimura, Kakogawa (JP); Tetsushi Deura, Kobe (JP); Tomoko Sugimura, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/406,347

(22) PCT Filed: Jul. 17, 2013

(86) PCT No.: PCT/JP2013/069445
§ 371 (c)(1),
(2) Date: Dec. 8, 2014

(87) PCT Pub. No.: WO2014/017362
PCT Pub. Date: Jan. 30, 2014

(65) Prior Publication Data
US 2015/0147223 A1    May 28, 2015

(30) Foreign Application Priority Data

Jul. 24, 2012 (JP) ................. 2012-163623

(51) Int. Cl.
| | |
|---|---|
| C22C 29/12 | (2006.01) |
| C22C 38/28 | (2006.01) |
| C22C 38/00 | (2006.01) |
| C21D 9/40 | (2006.01) |
| F16C 33/32 | (2006.01) |
| F16C 33/34 | (2006.01) |
| F16C 33/62 | (2006.01) |
| C22C 38/02 | (2006.01) |
| C22C 38/04 | (2006.01) |
| C22C 38/06 | (2006.01) |
| C21D 9/36 | (2006.01) |
| C21D 9/38 | (2006.01) |
| C22C 38/60 | (2006.01) |
| F16C 33/30 | (2006.01) |

(52) U.S. Cl.
CPC .............. *C22C 38/002* (2013.01); *C21D 9/36* (2013.01); *C21D 9/38* (2013.01); *C21D 9/40* (2013.01); *C22C 29/12* (2013.01); *C22C 38/00* (2013.01); *C22C 38/001* (2013.01); *C22C 38/02* (2013.01); *C22C 38/04* (2013.01); *C22C 38/06* (2013.01); *C22C 38/28* (2013.01); *C22C 38/60* (2013.01); *F16C 33/30* (2013.01); *F16C 33/32* (2013.01); *F16C 33/34* (2013.01); *F16C 33/62* (2013.01); *C21D 2211/004* (2013.01)

(58) Field of Classification Search
CPC ....................................................... C22C 29/12
See application file for complete search history.

(56) References Cited

U.S. PATENT DOCUMENTS

2011/0229363 A1    9/2011  Sakamoto et al.

FOREIGN PATENT DOCUMENTS

| | | | |
|---|---|---|---|
| JP | 62-130258 | 6/1987 | |
| JP | 2002-194497 | 7/2002 | |
| JP | 2009-7643 | 1/2009 | |
| JP | 2009-30145 | 2/2009 | |
| JP | 2009-52111 | 3/2009 | |
| JP | 2009-174033 | 8/2009 | |
| JP | 2010-7092 | 1/2010 | |
| JP | 2010-007092 A | * 1/2010 | ............. C22C 38/00 |
| JP | 2010-202905 | 9/2010 | |
| JP | 2010-202905 A | * 9/2010 | ............. C22C 38/00 |

OTHER PUBLICATIONS

International Search Report issued Oct. 1, 2013, in PCT/JP13/069445 filed Jul. 17, 2013.
Written Opinion of the International Searching Authority issued Oct. 1, 2013, in PCT/JP13/069445 filed Jul. 17, 2013.

* cited by examiner

*Primary Examiner* — Scott Kastler
*Assistant Examiner* — Vanessa Luk
(74) *Attorney, Agent, or Firm* — Oblon, McClelland, Maier & Neustadt, L.L.P.

(57) ABSTRACT

A bearing steel material which contains 0.8-1.1 mass % C, 0.15-0.8 mass % Si, 0.1-1.0 mass % Mn, 1.3-1.8 mass % Cr, up to 0.05 mass % P (0 mass % is excluded), up to 0.015 mass % S (0 mass % excluded), 0.0002-0.005 mass % Al, 0.0002-0.0020 mass % Ca, 0.0005-0.010 mass % Ti, up to 0.0080 mass % N (0 mass % is excluded), and up to 0.0025 mass % O (0 mass % is excluded). The steel material contains oxide inclusions which have an average composition that comprises, in terms of mass %, 20-50% CaO, 20-50% $Al_2O_3$, 20-70% $SiO_2$, and 3-10% $TiO_2$.

11 Claims, No Drawings

BEARING STEEL MATERIAL WITH EXCELLENT ROLLING FATIGUE PROPERTY AND BEARING PART

TECHNICAL FIELD

The present invention relates to a bearing steel material providing excellent rolling contact fatigue properties when used as rolling elements for bearings (rollers, needles, balls, races, etc.) to be used in various industrial machines and automobiles, etc., and to bearing parts obtained from the bearing steel material.

BACKGROUND ART

Rolling elements for bearings (rollers, needles, balls, races, etc.) used in the fields of various industrial machines and automobiles, etc. undergo high repeated stress in the radial direction (direction perpendicular to the axis of the rolling element). Accordingly, the rolling elements for bearings are required to have excellent rolling contact fatigue properties. The demands for rolling contact fatigue properties have become more stringent year after year in response to the trend of increasing the performance and reducing the weight in industrial machines. Bearing steel material is required to have better rolling contact fatigue properties in order to further improve the durability of bearing parts.

It was considered heretofore that the rolling contact fatigue properties intensely correlate with the number density of oxide inclusions formed in the steel, mainly, hard oxide inclusions such as $Al_2O_3$ formed when an Al deoxidized steel is used and the rolling contact fatigue properties are improved by reducing the number density of the hard oxide inclusions. Accordingly, it was attempted to improve the rolling contact fatigue properties by decreasing the oxygen content in the steel in the steel making process.

In recent years, however, a study has been progressed on the relation between the rolling contact fatigue properties and the non-metallic inclusions typically represented by oxide inclusions and it has been found that the number density of the oxide inclusions and the rolling contact fatigue properties are not always in a correlationship. That is, it has been revealed that the rolling contact fatigue properties are in a close correlation with the size of the non-metallic inclusions, for example, the square root of the area of the non-metallic inclusions and, for improving the rolling contact fatigue properties, it is more effective to decrease the size of the non-metallic inclusions than to reduce the number density of the non-metallic inclusions.

Then, instead of using the Al deoxidized steel as usual, there has been proposed a method of improving the rolling contact fatigue properties by suppressing the Al content in the steel as much as possible and forming Si deoxidized steel to control the composition of formed oxides to a composition mainly consisting of $SiO_2$, CaO, etc. instead of the composition mainly consisting of $Al_2O_3$, thereby elongating and segmenting the non-metallic inclusions in the rolling step to decrease the size of the non-metallic inclusions.

For example, the Patent Literature 1 proposes a bearing steel material in which an average composition of oxides comprises, in mass %, 10 to 60% of CaO, 20% or less of $Al_2O_3$, 50% or less of MnO, 15% or less of MgO, and the balance of $SiO_2$ and impurities, in which the value for the arithmetic mean of the maximum thickness of the oxides and the value for the arithmetic mean of the maximum thickness of sulfides present in an area of 100 mm² at 10 locations of the vertical cross section in the longitudinal direction of the steel material are 8.5 μm or less respectively. As a method of manufacturing such a bearing steel material, there has been disclosed a method of elongating and segmenting not only oxides but also sulfides by strictly controlling the main constituent components of the slug in the process of secondary refinement and refining the oxides, and reducing the amount of S and appropriately controlling the rolling down conditions such as roll down ratio and the working temperature for sulfides which are difficult to be elongated or segmented by usual rolling down.

Further, the Patent Literature 2 discloses an Si deoxidized steel material at high cleanliness containing a predetermined amount of $ZrO_2$ as an oxide component not known so far in the oxide inclusions described in the Patent Literature 1. The Patent Literature 2 describes that "$ZrO_2$ used in a small amount contributes to retainment of an amorphous phase of the oxide inclusions and has an effect of suppressing the formation of other crystal phases when a crystal phase containing $ZrO_2$ is formed. Accordingly, oxide inclusions remaining in the hot rolling and cold forging rolling step are segmented and refined more reliably than usual and the formation of coarse inclusions is suppressed".

On the other hand, the technique taking notice on the interfacial peeling between the steel as the matrix and the non-metallic inclusions includes Patent Literature 3. The Patent Literature 3 proposes a technique of improving the rolling contact fatigue properties by controlling such that the difference of Young's modulus of steel and Young's modulus of the inclusions is decreased. The Patent Literature 3 has been accomplished based on the following finding. "The amount of Al in the steel manufactured by an existent Al deoxidizing step is about 0.015 to 0.025% and, as a result, since the inclusions containing much Al has a Young's modulus extremely higher compared with that of the steel (matrix), voids tend to be formed at the interface between the matrix and the inclusions and by way of the formation of the void, tensile strength exerts on the periphery of the void to readily occur cracks. Further, when soft non-metallic inclusions similar to voids are present in the steel, cracks are readily formed at the periphery thereof by the effect of the tensile stress". It discloses a steel in which Al is less than 0.010% and Young's modulus ratio $E_2/E_1$ is controlled to a range of $0.3 < E_2/E_1 < 1.6$ assuming $E_1$ as the Young's modulus of the steel and $E_2$ as an average Young's modulus of inclusions at a size of 15 μm or more (maximum length in the vertical direction×the maximum length in the lateral direction)$^{1/2}$ present in 3000 mm² of a microscopic examination area in the steel when the size of the inclusions is defined as (maximum length in the vertical direction×the maximum length in the lateral direction)$^{1/2}$.

That is, in the Patent Literature 3, Young's modulus ratio $E_2/E_1$ is controlled in a range of $0.3 < E_2/E_1 < 1.6$ with the recognition that the tensile strength exerts on the interface between the steel of the matrix and the non-metallic inclusions for the soft non-metallic inclusions at $E_2/E_1$ of 0.3 or less which is similar to voids or non-metallic inclusions at $E_2/E_1$ of 1.6 or more that tends to form voids to worsen the rolling contact fatigue properties.

CITATION LIST

Patent Literature

PTL 1: Japanese Unexamined Patent Application Publication (JP-A) No. 2009-30145

PTL 2: Japanese Unexamined Patent Application Publication (JP-A) No. 2010-202905

PTL 3: Japanese Unexamined Patent Application Publication (JP-A) No. 2009-52111

SUMMARY OF INVENTION

Technical Problem

However, the Patent Literature 1 only evaluates that a satisfactory rolling contact fatigue life is obtained when a thrust type rolling contact fatigue tester is used. According to this method, although the rolling contact fatigue properties in the thrust direction (direction identical with that of the axis of the rolling element) are improved, it may be a worry that the rolling contact fatigue life is deteriorated if a load exerts in the radial direction (direction perpendicular to the axis of the rolling element). As a result, there is a problem that the rolling contact fatigue properties cannot be improved stably depending on the exerting direction of the load. Further, it cannot be said that sufficient rolling contact fatigue properties can be obtained for the voids at the interface between the steel and the oxide inclusions since a countermeasure for suppressing the voids is not taken.

Also the Patent Literature 2 does not describe at all for the voids formed by the interfacial peeling and voids formed inside the oxide inclusions. In the first place, this is a technique focusing only on the refinement of the entire non-metallic inclusions and, in the evaluation of examples, it is only evaluated by the value of arithmetic mean for the evaluation score of the C-base inclusions according to the ASTM $E_{45}$ method. Accordingly, the steel material manufactured as described above does not always provide excellent rolling contact fatigue properties.

Further, it has been found that even when the Young's modulus ratio is controlled in the range of $0.3 < E_2/E_1 < 1.6$ as in the Patent Literature 3, the oxide inclusions obtained by Si deoxidization are partially crystallized to polycrystals in a high temperature region such as of hot working, or a mixed phase containing a plurality of crystals and amorphous phases. In the oxide inclusions in the form of the polycrystals voids tend to be formed at the interface between the steel as the matrix and the oxide inclusions upon hot working or cold working. Further, since voids tend to be formed at the interface between each of the crystals and the interface between the crystal and the amorphous body, the rolling contact fatigue life is deteriorated.

As described above, improvement of the rolling contact fatigue properties is insufficient by the method of controlling only the maximum thickness of the non-metallic inclusions (so-called maximum minor diameter) (Patent Literature 1), the method of controlling the ratio of the amorphous phase in the non-metallic inclusions (Patent Literature 2) and the method of suppressing voids at the interface between the steel and the non-metallic inclusion (Patent Literature 3). Further, improvement of the rolling contact fatigue property is insufficient in a case where the load exerts in the radial direction. For example, it was found in the method of Patent Literature 1 that the maximum major diameter of the non-metallic inclusions is rather coarsened and there is a risk of making the rolling contact fatigue properties anisotropic.

The present invention has been accomplished in view of the situations described above and it intends to provide a novel steel material used for bearing which is extremely excellent in the rolling contact fatigue properties and capable of suppressing early peeling.

Solution to Problem

The gist of the bearing steel material according to the present invention resides in consisting of from 0.8 to 1.1% of C (% means mass % which is identical here and hereinafter unless otherwise specified), from 0.15 to 0.8% of Si, from 0.1 to 1.0% of Mn, from 1.3 to 1.8% of Cr, 0.05% or less (not inclusive of 0%) of P, 0.015% or less (not inclusive of 0%) of S, from 0.0002 to 0.005% of Al, from 0.0002 to 0.0020% of Ca, from 0.0005 to 0.010% of Ti, 0.0080% or less (not inclusive of 0%) of N, 0.0025% or less (not inclusive of 0%) of O, and the balance consisting of iron and unavoidable impurities in which the average composition of oxide inclusions contained in the steel material contains from 20 to 50% of CaO, from 20 to 50% of $Al_2O_3$, from 20 to 70% of $SiO_2$, from 3 to 10% of $TiO_2$, and the balance consisting of impurities.

In a preferred embodiment of the present invention, an average aspect ratio (major diameter/minor diameter) of the oxide inclusion present on a plane cross sectioned in parallel with the longitudinal direction of the steel material is restricted to 3.0 or less.

Further, in a preferred embodiment of the present invention, an average value of the aspect ratio (major diameter/minor diameter) is 1.0 or more.

In the present invention, bearing parts obtained by using the bearing steel material are also included within the scope of the invention.

Advantageous Effects of Invention

According to the present invention, since the chemical component composition of the steel material and the composition of the oxide inclusions contained in the steel are controlled appropriately, the bearing steel material is highly excellent in the rolling contact fatigue properties and capable of suppressing early peeling. Such a bearing steel material is useful not only as the material of bearing parts to which load exerts repetitively mainly in the radial direction such as rollers, needles, balls, etc. but is also useful as a material for bearing parts to which load exerts repetitively also in the thrust direction such as races, and the rolling contact fatigue properties can be improved stably irrespective of the load exerting direction.

DESCRIPTION OF EMBODIMENTS

The present inventors have made various studies in order to provide an Si-deoxidized steel material used for a bearing capable of stably improving the rolling contact fatigue properties irrespective of the load exerting direction without Al deoxidizing treatment, thereby capable of suppressing early peeling.

As has been described above, while the oxide inclusions obtained by Si deoxidization are crystallized in a high temperature region such as in hot working to form polycrystals, the oxide inclusions in the form of polycrystals tend to form voids at the interface between the steel (matrix) and the oxide inclusions during hot working or cold working since they have deformation resistance higher than that of the steel as the matrix. Then, the present inventors have made an earnest study on the method of suppressing crystallization by controlling the composition of the oxide inclusions obtained by Si deoxidization to form an amorphous body thereby suppressing occurrence of the voids. As a result, it has been found that crystallization can be suppressed by incorporating $TiO_2$ not contained so far in the oxide inclusions obtained by Si deoxidization. Specifically, the present invention has been accomplished based on the finding that the intended purpose can be attained by using an Si deoxidized steel material containing Ti within a predetermined range as a component in the steel and containing $TiO_2$ within a predetermined range as the oxide inclusion.

In the present invention, the reason that the rolling contact fatigue properties are improved by adopting the composition containing $TiO_2$ for the oxide inclusion is not yet apparent specifically but it may be considered as below.

That is, when $TiO_2$ is contained in the $SiO_2$-containing oxide inclusions obtained by Si deoxidization, they are separated in two phases of a thickened $TiO_2$ phase (phase A) and a thickened $SiO_2$ phase (phase B). It is considered that they are separated into the two phases because $TiO_2$ has a nature of separating into two liquid phases of $TiO_2$ and $SiO_2$ in the steel melting stage. As a result, $SiO_2$ concentration is increased in the thickened $SiO_2$ phase (phase B), and crystallization to ghelinite, spinel ($MgO.Al_2O_3$) etc. which were tended to be formed in the Si-deoxidized steel is suppressed. On the other hand, also for the thickened $TiO_2$ phase (phase A), since the liquidus phase line temperature is also lowered due to incorporation of $TiO_2$ in the oxide inclusions to suppress crystallization of ghelinite and spinel described above. As a result, crystallization of the $SiO_2$-containing oxide inclusions during the hot working described above can be suppressed. As a result, voids formed at the interface between the steel of the matrix and the oxide inclusions can be suppressed. Further, voids formed inside the oxide inclusions as polycrystals can also be suppressed. As a result, the rolling contact fatigue properties can be improved remarkably.

Further, since the thickened $SiO_2$ phase (phase B) is at a high $SiO_2$ concentration, it has high deformation resistance during hot working in spite of its amorphous nature. Accordingly, elongation of inclusions during hot working can be suppressed while maintaining the amorphous state. As a result, since the aspect ratio (major diameter/minor diameter) can be kept at a low level, the rolling contact fatigue properties can be improved stably irrespective of the load exerting direction and the early peeling can be suppressed.

On the contrary, none of the Patent Literatures 1 to 3 described above discloses the technical idea of the present invention that intends to improve the rolling contact fatigue properties by the addition of Ti and formation of $TiO_2$. The Ti content in the steel is low and the predetermined $TiO_2$ concentration cannot be obtained in the oxides. As a result, voids formed at the interface between the steel of the matrix and the oxide inclusions, voids formed at the interface between each of the crystals inside the oxide inclusions, and the voids formed at the interface between each of the crystals and at the interface between the crystal and the amorphous cannot be suppressed. Further it has been found that the aspect ratio of the oxide inclusions exceeds a predetermined range and no desired rolling contact fatigue properties can be ensured (refer to examples to be described later).

The present invention is to be described specifically.

As has been described above, the bearing steel material excellent in the rolling contact fatigue properties according to the present invention has a feature in containing from 0.8 to 1.1% of C (% means mass %) which is identical here and hereinafter unless otherwise specified), from 0.15 to 0.8% of Si, from 0.1 to 1.0% of Mn, from 1.3 to 1.8% of Cr, 0.05% or less (not inclusive of 0%) of P, 0.015% or less (not inclusive of 0%) of S, from 0.0002 to 0.005% of Al, from 0.0002 to 0.0020% of Ca, from 0.0005 to 0.010% of Ti, 0.0080% or less (not inclusive of 0%) of N, 0.0025% or less (not inclusive of 0%) of O, and the balance consisting of iron and avoidable impurities, in which the average composition of oxide inclusions contained in the steel contains, on the mass % basis, from 20 to 50% of CaO, from 20 to 50% of $Al_2O_3$, from 20 to 70% of $SiO_2$, from 3 to 10% of $TiO_2$, and the balance consisting of impurities.

First, components in the steel are to be described.

[C: 0.8 to 1.1%]

C is an essential element for increasing quenching hardness and maintaining a strength at a room temperature and at a high temperature thereby imparting the wear resistance. In order to provide such effects, C is required to be incorporated at least by 0.8% or more. However, if the C content is too high beyond 1.1%, huge carbides are likely to be formed in the core portion of a bearing, which will adversely affect on rolling contact fatigue properties. The C content is preferably 0.85% or more (more preferably 0.90% or more), and preferably 1.05% or less (more preferably 1.0% or less).

[Si: 0.15 to 0.8%]

Si effectively acts as a deoxidizing element, and also has a function of increasing the hardness by increasing quenching and temper-softening resistance. In order to effectively provide such effects, it is required to incorporate 0.15% or more of Si. However, if the content of Si is excessive beyond 0.8%, a mold life is shortened during forging, which also leads to increased cost. The Si content is preferably 0.20% or more (more preferably 0.25% or more), and preferably 0.7% or less (more preferably 0.6% or less).

[Mn: 0.1 to 1.0%]

Mn is an element that increases the solid solution strengthening and the hardenability of a steel matrix. If the Mn content is less than 0.1%, the effect is not provided. If the content is more than 1.0%, the content of MnO that is a lower oxide is increased, to deteriorate rolling contact fatigue properties and decrease the workability and machinability remarkably. The Mn content is preferably 0.2% or more (more preferably 0.3% or more), and preferably 0.8% or less (more preferably 0.6% or less).

[Cr: 1.3 to 1.8%]

Cr is an element that is effective for improving the strength and the wear resistance by forming stable carbides, thereby improving the rolling contact fatigue properties effectively. In order to provide such an effect, it is required that the Cr content is 1.3% or more. However, if the Cr content is excessive beyond 1.8%, carbides become coarse, to deteriorate the rolling contact fatigue properties and cutting property. The Cr content is preferably 1.4% or more (more preferably 1.5% or more), and is preferably 1.7% or less (more preferably 1.6% or less).

[P: 0.05% or less (not inclusive of 0%)]

P is an impurity element that segregates in a crystal grain interface and adversely affects on the rolling contact fatigue properties. In particular, if the P content is more than 0.05%, the rolling contact fatigue properties are remarkably deteriorated. Accordingly, it is required to restrict the P content to 0.05% or less. It is preferably 0.03% or less, and more preferably 0.02% or less. P is an impurity that is unavoidably contained in a steel material, and it is industrially difficult to reduce the amount to be 0%.

[S: 0.015% (not inclusive of 0%)]

S is an element that forms sulfides and if the content is more than 0.015%, since coarse sulfides remain, rolling contact fatigue properties are deteriorated. Accordingly, it is required to restrict the S content to 0.015% or less. With a view point of improving the rolling contact fatigue properties, a lower S content is more suitable, and it is preferably 0.007% or less, and more preferably 0.005% or less. S is an impurity that is unavoidably contained in a steel material, and it is industrially difficult to reduce the amount to 0%.

[Al: 0.0002 to 0.005%]

Al is an undesirable element, and it is required to decrease Al as much as possible in the steel material according to the present invention. Accordingly, a deoxidizing treatment by the addition of Al is not performed after oxidation refining. If the Al content is high, in particular, more than 0.005%, since hard oxides mainly consisting of $Al_2O_3$ are formed in a large amount, and they remain as coarse oxides even after rolling, the rolling contact fatigue properties are deteriorated. Accordingly, the Al content is defined as 0.005% or less. The Al content is preferably 0.002% or less, and more preferably 0.0015% or less. However, if the Al content is less than 0.0002%, the $Al_2O_3$ content is too low in the oxides, and a crystal phase containing much $SiO_2$ is formed. For controlling the $Al_2O_3$ content to less than 0.0002%, it is necessary to decrease the $Al_2O_3$ content not only as the component in the steel but also in the flux for suppressing the intrusion of Al. However, a flux of less $Al_2O_3$ content in the bearing steel which is a high carbon steel is extremely expensive and not economical. Accordingly, the Al content is 0.0002% or more (preferably 0.0005% or more).

[Ca: 0.0002 to 0.0020%]

Ca is effective for controlling the CaO content in oxide inclusions and suppressing crystallization of the oxide inclusions thereby improving the rolling contact fatigue properties. In order to exert such effects, the Ca content is defined as 0.0002% or more. However, if the Ca content is excessively high beyond 0.0020%, the CaO ratio becomes too high in an oxide composition, whereby the oxides are crystallized. Accordingly, the Ca content is defined as 0.0020% or less. The Ca content is preferably 0.0003% or more (more preferably 0.0005% or more), and preferably 0.001% or less (more preferably 0.0008%) or less.

[Ti: 0.0005 to 0.010%]

Ti is a characteristic element in the present invention. Problems difficult to be solved so far (crystallization of $SiO_2$-containing oxide inclusions obtained by Si-deoxidized steel, voids formed at the interface between the steel of the matrix and the oxide inclusions, and voids formed inside the oxide inclusions as polycrystals) can be solved by adding a predetermined amount of Ti and properly controlling the $TiO_2$ content in the oxides, by which the rolling contact fatigue properties are improved further. Further, a predetermined amount of Ti acts effectively for reducing the aspect ratio thereby further improving the rolling contact fatigue properties. In order to provide such effects, it is necessary that the Ti content is 0.0005% or more. However, if the Ti content increases beyond 0.010%, $TiO_2$ oxides are formed alone as the crystal phase. Accordingly, the Ti content is defined as 0.010% or less. The Ti content is preferably 0.0008% or more (more preferably, 0.0011% or more), and it is preferably 0.0050% or less (more preferably, 0.0030% or less).

[N: 0.0080% or less (not inclusive of 0%)]

Since N forms TiN and worsens the rolling contact fatigue properties, it is recommended to reduce N as much as possible and the upper limit of the N content is defined as 0.0080% or less. The N content is preferably 0.007% or less and, more preferably, 0.006% or less.

[O: 0.0025% or less (exclusive of 0%)]

O is an undesired impurity element. If the O content is high, in particular, more than 0.0025%, coarse oxide-inclusions are liable to be formed and since they remain also after hot rolling and cold rolling and adversely affect on rolling contact fatigue properties, it is defined as 0.0025% or less. The O content is preferably 0.0023% or less (more preferably 0.0020% or less).

Contained elements defined in the present invention are as described above, and the balance is iron and unavoidable impurities. As the unavoidable impurities, elements which are introduced depending on the raw materials, materials, and situations of manufacturing facilities, etc., (such as As, H, and N) may be allowed to be mixed.

Then, the oxide inclusions present in the steel material are to be explained. As described above, the present invention has a feature for the oxides contained in the steel in that the average composition of the oxides contains, at a ratio (mass %) based on the entire oxides, from 20 to 50% of CaO, from 20 to 50% of $Al_2O_3$, from 20 to 70% of $SiO_2$, and from 3 to 10% or $TiO_2$, and the balance of impurities.

[CaO: 20 to 50%]

Ca is a basic oxide and has an effect of lowering the liquidus line temperature of the oxides and suppressing the crystallization of oxides, when contained in $SiO_2$ as an acidic oxide. It has an important role of reducing the aspect ratio of the oxide inclusions. Such an effect can be obtained by controlling the CaO content to 20% or more in an average oxide composition. However, since the oxides are crystallized if the CaO content is too high, it is necessary to reduce the content to 50% or less %. The CaO content in the oxides is preferably 22% or more (more preferably 25% or more) and it is preferably 43% or less (more preferably 41% or less).

[$Al_2O_3$: 20 to 50%]

$Al_2O_3$ is an amphoteric oxide and has an effect of lowering the liquidus line temperature of the oxides and suppressing the crystallization of the oxides when contained in $SiO_2$ which is an acidic oxide. Such effects can be obtained by controlling an $Al_2O_3$ content to 20% or more in the average composition of the oxides. On the other hand, if the content in the average composition of the oxides exceeds 50%, an $Al_2O_3$ (corundum) crystal phase precipitates or a $MgO$—$Al_2O_3$ (spinel) crystal phase precipitates together with MgO. Or such crystal phases are formed at a rolling temperature region. The solid phases are hard and present as coarse inclusions which tend to form voids during working to worsen the rolling contact fatigue properties. With such a view point, it is necessary to restrict the $Al_2O_3$ content in the average composition of the oxides to 50% or less. The $Al_2O_3$ content in the oxides is preferably 22% or more (more preferably 25% or more) and, it is preferably 43% or less (more preferably, 41% or less).

[$SiO_2$: 20 to 70%]

$SiO_2$ is an acidic oxide, which is an indispensable component for amorphization of the oxide inclusions. In order to provide such an effect effectively, it is necessary to incorporate $SiO_2$ by 20% or more in the oxides. However, if the $SiO_2$ content exceeds 70%, since a crystal phase containing much $SiO_2$ is formed and voids are formed, the rolling contact fatigue properties are deteriorated. The $SiO_2$ content in the oxides is preferably 25% or more (more preferably, 30% or more) and it is preferably 50% or less (more preferably 45% or less).

[$TiO_2$: 3 to 10%]

$TiO_2$ is an oxide component characterizing the present invention and when contained in $SiO_2$ which is the acidic oxide, it can be separated into two phases of a thickened $TiO_2$ phase (phase A) and a thickened $SiO_2$ phase (phase B) and both of the phases can suppress crystallization. As a result, this can suppress the crystallization of $SiO_2$-containing oxide inclusions obtained in a Si-deoxidized steel, suppress voids formed at the interface between the steel of the matrix and the oxide inclusions and suppress voids formed also inside the oxide inclusions which are polycrystals, thereby further improving the rolling contact fatigue properties. Further, the aspect ratio can also be decreased. Such effects can be obtained by controlling the $TiO_2$ content in the average composition of the oxides to 3% or more. However, if the $TiO_2$ content is excessively high, since $TiO_2$ oxides are formed alone as a crystal phase to form voids and deteriorate the rolling contact fatigue property, it is defined as 10% or less. The $TiO_2$ content in the oxides is preferably 4% or more, (more preferably, 5% or more) and it is preferably 8% or less (more preferably, 7% or less).

As described above, the oxides contained in the steel material according to the present invention comprise CaO, $Al_2O_3$, $SiO_2$, $TiO_2$, and the balance of impurities. The impurities include those contained unavoidably in the manufacturing process or the like. The impurities can be contained to such an extent that desired properties can be obtained without giving undesired effects on the crystallization state and the aspect ratio of oxide inclusions. It is preferably controlled as the entire impurity (total amount) to about 20% or less. Specifically, it is possible to contain $ZrO_2$ by about 1% or less, MgO by about 8% or less, $Na_2O$ by about 5% or less, and $Cr_2O_3$ in a range of about 5% or less. Further, MnO is an oxide having a relatively broad allowable range and can be contained within a range of about 15% or less at the maximum.

Further, in the present invention, the aspect ratio (major diameter/minor diameter) of the oxide inclusions present at the vertical cross section of the steel material in the longitudinal direction is decreased to 3.0 or less in average (hereinafter sometimes referred to simply as an aspect ratio) by properly controlling the components in the steel and the oxide composition as described above. Thus, the rolling contact fatigue properties can be improved stably irrespective of a load exerting direction. Smaller aspect ratio provides better result and it is preferably about 2.5 or less and, more preferably, 2.0 or less. The aspect ratio is 1.0 or more and preferably 1.1 or more.

The method of measuring the aspect ratio is described specifically in the section of examples to be described later.

Then, a method for manufacturing the steel material is to be explained. In the present invention, the steel material may be manufactured taking notice on each of the steps, particularly, the melting step and, further, the hot working step so as to obtain a predetermined oxide composition. Other steps can be properly selected from the method used usually for the manufacture of bearing steels and used.

A preferred melting method for obtaining the oxide composition described above is as described below.

First, when the steel material is melted, deoxidization with addition of Si is performed without the deoxidizing treatment by Al addition which has been performed usually. During melting, for controlling each of the contents of CaO and $Al_2O_3$, the Al content is controlled to 0.0002 to 0.005% and the Ca content is controlled to 0.0002 to 0.0020% respectively in the steel as described above.

First, the method of controlling $TiO_2$ is not particularly restricted and Ti may be added such that the Ti content in the steel is controlled within a range from 0.0005 to 0.010% as described above upon melting based on the method used usually in the relevant technical field. The addition method of Ti is not particularly restricted but, for example, may be controlled by adding a Ti-containing ferrous alloy, or the Ti concentration in the molten steel may be controlled by controlling a slug composition.

$SiO_2$ can be obtained by controlling other oxides as described above.

In the present invention, after rolling and spheroidization annealing, the steel material controlled to the chemical component composition as described above, hot working or cold working is performed.

After obtaining the steel material of the present invention as described above, when it is formed into a predetermined shape of a part and quenched and tempered, a bearing part of the present invention can be obtained. The configuration in the course of the steel material includes any of linear or bar-like shape applicable to such manufacture and the size thereof can also be determined optionally in accordance with final products.

The bearing parts described above include, for example, rollers, needles, balls, and races.

The present invention is to be described more specifically by way of examples but the invention is not restricted to the following examples and can be practiced being modified within a range adaptable to the gist described above and to be described later, any of which is included in the technical range of the present invention.

EXAMPLE

Test steels of various chemical component compositions shown in the following Table 1 (balance consisting of iron and unavoidable impurities) were melted by using a small-size melting furnace (capacity 150 kg/1 ch) to manufacture cast slabs ($\phi$245 mm×480 mm). Upon melting, a cradle consisting of MgO refractory was used and, after adjusting the amount of dissolved oxygen by using C, Si, Mn, and Cr, without Al deoxidizing treatment usually applied. Ti and Ca were charged in this order to control the Ti content and the Ca content. In this example, a Ni—Ca alloy was used as Ca and a Fe—Ti alloy was used as Ti source respectively to the molten steel. Table 1 shows the chemical components of the cast slabs obtained as described above.

TABLE 1

| Steel material | Chemical component (mass %) Balance: iron and unavoidable impurities | | | | | | | | | | |
|---|---|---|---|---|---|---|---|---|---|---|---|
| No. | C | Si | Mn | Cr | P | S | Al | Ca | O | Ti | N |
| 1 | 1.18 | 0.25 | 0.34 | 1.3 | 0.012 | 0.005 | 0.0008 | 0.0006 | 0.0012 | 0.0011 | 0.0055 |
| 2 | 0.98 | 0.22 | 1.08 | 1.4 | 0.011 | 0.006 | 0.0011 | 0.0005 | 0.0018 | 0.0015 | 0.0059 |
| 3 | 1.02 | 0.24 | 0.42 | 2.0 | 0.012 | 0.005 | 0.0009 | 0.0007 | 0.0014 | 0.0018 | 0.0048 |
| 4 | 1.03 | 0.20 | 0.36 | 1.2 | 0.013 | 0.006 | 0.0008 | 0.0006 | 0.0016 | 0.0016 | 0.0055 |
| 5 | 0.98 | 0.30 | 0.34 | 1.3 | 0.060 | 0.005 | 0.0010 | 0.0005 | 0.0017 | 0.0012 | 0.0056 |
| 6 | 0.92 | 0.28 | 0.32 | 1.3 | 0.010 | 0.018 | 0.0012 | 0.0004 | 0.0014 | 0.0015 | 0.0053 |
| 7 | 1.01 | 0.28 | 0.46 | 1.4 | 0.015 | 0.005 | 0.0060 | 0.0002 | 0.0011 | 0.0013 | 0.0054 |
| 8 | 1.00 | 0.26 | 0.42 | 1.4 | 0.012 | 0.006 | 0.0040 | 0.0004 | 0.0016 | 0.0021 | 0.0051 |
| 9 | 0.99 | 0.25 | 0.36 | 1.4 | 0.011 | 0.006 | 0.0018 | 0.0005 | 0.0013 | 0.0014 | 0.0055 |
| 10 | 0.96 | 0.22 | 0.38 | 1.4 | 0.013 | 0.005 | 0.0014 | 0.0005 | 0.0012 | 0.0017 | 0.0056 |
| 11 | 1.05 | 0.24 | 0.33 | 1.3 | 0.014 | 0.007 | 0.0007 | 0.0006 | 0.0017 | 0.0013 | 0.0052 |
| 12 | 0.89 | 0.24 | 0.36 | 1.4 | 0.012 | 0.007 | 0.0002 | 0.0004 | 0.0019 | 0.0017 | 0.0050 |

TABLE 1-continued

| Steel material No. | Chemical component (mass %) Balance: iron and unavoidable impurities | | | | | | | | | | |
|---|---|---|---|---|---|---|---|---|---|---|---|
| | C | Si | Mn | Cr | P | S | Al | Ca | O | Ti | N |
| 13 | 0.93 | 0.30 | 0.35 | 1.4 | 0.012 | 0.006 | 0.0001 | 0.0001 | 0.0020 | 0.0005 | 0.0059 |
| 14 | 1.02 | 0.19 | 0.37 | 1.4 | 0.011 | 0.007 | 0.0003 | 0.0021 | 0.0011 | 0.0014 | 0.0053 |
| 15 | 0.91 | 0.24 | 0.43 | 1.3 | 0.010 | 0.006 | 0.0006 | 0.0016 | 0.0012 | 0.0013 | 0.0057 |
| 16 | 1.03 | 0.22 | 0.39 | 1.4 | 0.013 | 0.005 | 0.0008 | 0.0009 | 0.0014 | 0.0012 | 0.0056 |
| 17 | 0.95 | 0.26 | 0.33 | 1.4 | 0.012 | 0.006 | 0.0007 | 0.0007 | 0.0016 | 0.0013 | 0.0055 |
| 18 | 0.96 | 0.24 | 0.40 | 1.4 | 0.012 | 0.006 | 0.0010 | 0.0005 | 0.0015 | 0.0017 | 0.0051 |
| 19 | 0.99 | 0.22 | 0.37 | 1.4 | 0.011 | 0.006 | 0.0009 | 0.0002 | 0.0014 | 0.0014 | 0.0056 |
| 20 | 0.98 | 0.26 | 0.42 | 1.4 | 0.013 | 0.007 | 0.0013 | 0.0001 | 0.0017 | 0.0011 | 0.0053 |
| 21 | 0.96 | 0.30 | 0.36 | 1.4 | 0.011 | 0.006 | 0.0008 | 0.0006 | 0.0008 | 0.0108 | 0.0057 |
| 22 | 1.02 | 0.24 | 0.38 | 1.3 | 0.010 | 0.006 | 0.0009 | 0.0007 | 0.0009 | 0.0082 | 0.0054 |
| 23 | 0.98 | 0.28 | 0.41 | 1.4 | 0.013 | 0.006 | 0.0007 | 0.0006 | 0.0013 | 0.0012 | 0.0058 |
| 24 | 1.05 | 0.27 | 0.40 | 1.3 | 0.014 | 0.006 | 0.0006 | 0.0007 | 0.0017 | 0.0008 | 0.0053 |
| 25 | 0.96 | 0.26 | 0.25 | 1.4 | 0.012 | 0.005 | 0.0003 | 0.0008 | 0.0018 | 0.0004 | 0.0052 |
| 26 | 1.02 | 0.25 | 0.52 | 1.4 | 0.011 | 0.006 | 0.0011 | 0.0006 | 0.0015 | 0.0016 | 0.0085 |
| 27 | 1.00 | 0.26 | 0.41 | 1.4 | 0.012 | 0.006 | 0.0007 | 0.0006 | 0.0014 | 0.0015 | 0.0077 |
| 28 | 0.91 | 0.26 | 0.43 | 1.3 | 0.013 | 0.006 | 0.0005 | 0.0004 | 0.0018 | 0.0018 | 0.0068 |
| 29 | 0.96 | 0.24 | 0.41 | 1.4 | 0.010 | 0.006 | 0.0006 | 0.0006 | 0.0011 | 0.0022 | 0.0057 |
| 30 | 0.92 | 0.19 | 0.32 | 1.4 | 0.010 | 0.006 | 0.0003 | 0.0004 | 0.0032 | 0.0011 | 0.0055 |
| 31 | 0.95 | 0.24 | 0.41 | 1.4 | 0.011 | 0.005 | 0.0005 | 0.0005 | 0.0024 | 0.0015 | 0.0053 |
| 32 | 1.03 | 0.25 | 0.42 | 1.4 | 0.011 | 0.005 | 0.0008 | 0.0007 | 0.0018 | 0.0017 | 0.0051 |
| 33 | 0.99 | 0.29 | 0.36 | 1.4 | 0.010 | 0.006 | 0.0002 | 0.0003 | 0.0016 | 0.0005 | 0.0049 |
| 34 | 1.00 | 0.26 | 0.34 | 1.4 | 0.013 | 0.006 | 0.0006 | 0.0006 | 0.0017 | 0.0012 | 0.0056 |
| 35 | 1.04 | 0.30 | 0.40 | 1.4 | 0.012 | 0.006 | 0.0008 | 0.0008 | 0.0013 | 0.0018 | 0.0055 |
| 36 | 0.98 | 0.24 | 0.42 | 1.3 | 0.011 | 0.006 | 0.0009 | 0.0009 | 0.0012 | 0.0015 | 0.0051 |
| 37 | 0.96 | 0.26 | 0.33 | 1.4 | 0.013 | 0.006 | 0.0012 | 0.0008 | 0.0010 | 0.0011 | 0.0057 |
| 38 | 0.99 | 0.19 | 0.37 | 1.4 | 0.012 | 0.006 | 0.0018 | 0.0008 | 0.0012 | 0.0014 | 0.0053 |
| 39 | 0.98 | 0.24 | 0.34 | 1.4 | 0.013 | 0.006 | 0.0008 | 0.0008 | 0.0014 | 0.0015 | 0.0052 |
| 40 | 0.97 | 0.20 | 0.47 | 1.5 | 0.012 | 0.005 | 0.0215 | 0.0000 | 0.0007 | 0.0008 | 0.0065 |

After heating the obtained cast slabs at 1100 to 1300° C. in a heating furnace, blooming was performed at 900 to 1200° C. Subsequently, they were rolled at 830 to 1100° C. and hot rolling was performed to a predetermined diameter (ϕ65 mm).

After heating the hot rolled materials in a temperature region of 760 to 800° C. for 2 to 8 hours, they were cooled to a temperature of (Ar1 transformation point−60° C.) at a cooling rate of 10-15° C./hour and then allowed to be cooled in atmospheric air (spheroidization annealing) to obtain a spheroidize-annealed material in which spheroidized cementite was dispersed.

Test pieces of ϕ60 mm and 6 mm thickness were cut out from the spheroidize-annealed material, oil-quenched after heating at 840° C. for 30 minutes and tempered at 160° C. for 120 minutes. Finally, finish polishing was applied to manufacture thrust rolling contact fatigue test pieces with a surface roughness of 0.04 μm Ra or less.

Further, for measuring the composition of oxides (average composition), matrix (steel material) and the aspect ratio of oxide inclusions, the following test piece was used. First, a test piece of ϕ60 mm and 30 mm thickness was cut out from the spheroidize-annealed material obtained as described above, oil-quenched after heating at 840° C. for 30 minutes and tempered at 160° C. for 120 minutes.

A micro specimen (specimen for microstructure observation) of 20 mmL (length in the rolling direction)×5 mm (depth from the surface layer) was cue out along the longitudinal direction (corresponding to the rolling direction) of the steel material at a ½ position of the diameter D for each test specimen and the cross section was polished. The average composition of the oxide inclusions was observed by using an electron beam micro probe X-ray analyzer (Electron Probe X-ray Micro Analyzer: EPMA tradename "JXA-8500F") manufactured by JEOL DATUM and oxide inclusions with the minor diameter of 1 μm or more was quantitatively analyzed. Observation area was 100 mm$^2$ (polished surface), and the component composition at the central portion of the inclusions was quantitatively analyzed by wavelength dispersible X-ray spectrometry) of characteristic X-rays. Element as the target of analysis were Ca, Al, Si, Ti, Mn, Mg, Na, Cr, Zr, O (oxygen), a relation between the X-ray intensity of each of the elements and the density of element was previously determined as a calibration curve by using a known substance, the amount of the element contained in each specimen was determined based on the X-ray intensity obtained from the inclusions as the target of analysis and the calibration curve and an average inclusion composition was determined by arithmetic means for the results.

[Measurement of Aspect Ratio of Oxide Inclusions]

For measuring the aspect ratio of non-metallic inclusions, optional oxide inclusions (target elements of analysis: Ca, Al, Si, Ti, Mn, Mg, Na, Cr, Zr, and O (oxygen)) each having a minor diameter of 1 μm or more were selected by the number of 100. The major diameter and the minor diameter were measured for each of them to calculate the aspect ratio of each oxide inclusion. An average aspect ratio of the oxide inclusions was determined by arithmetic means of the result.

[Evaluation Method for Rolling Contact Fatigue Properties]

A thrust rolling contact fatigue test was performed by using the thrust rolling contact fatigue test pieces obtained as described above by a thrust fatigue tester (thrust type rolling contact fatigue tester (FJ-5T) manufactured by Fuji Testing Machine Corporation) under the conditions at a load speed of 1200 rpm, a number of steel spheres of three, a surface pressure of 5.24 GPa, a number of interruption of two hundred millions.

As a measure for rolling contact fatigue life, fatigue life $L_{10}$ (number of repeating stresses till fatigue fracture at 10% cumulative fracture probability; hereinafter sometimes referred to as "$L_{10}$") is usually used. Specifically, $L_{10}$ means a number of repetition till fatigue fracture at 10% cumulative fracture probability obtained by plotting the test result on Weibull probability paper (refer to "Bearing" Written by Munenori Sota (Iwanami Zensho)). The test described above was performed using specimens by the member of 16 for each steel material and they were (I) evaluated as "excellent in rolling contact fatigue life" for those having a life ratio of 2.5 times or more in terms of $L_{10}$ life (corresponding to 30,000,000 cycles or more in terms of $L_{10}$ life), (II) evaluated as "particularly excellent in rolling contact fatigue life" for those having a life ratio of 3.0 times or more in terms of $L_{10}$ life (corresponding to 36,000,000 cycles or more in terms of $L_{10}$ life) and (III) evaluated as "especially excellent in rolling contact fatigue life" for those having a life ratio of 3.5 times or more (corresponding to 42,000,000 cycles or more in terms of $L_{10}$ life), relative to the existent steel (steel No. 40 in Table 1).

Table 2 shows the result. Test No. in Table 2 uses the steel material No. in Table 1. In the column for $L_{10}$ life in Table 2, "E+07" means "×$10^7$". For example, "1.8E+07" described in the column for the test No. 1 in Table 2 means "1.8×$10^7$".

(chemical component composition and oxide composition of steel material) and the aspect ratio of the oxide inclusions is also controlled appropriately, it can be seen that they are excellent in the rolling contact fatigue life.

In this example, while the rolling contact fatigue properties are measured in the thrust direction, since the steel material of the present invention has a small aspect ratio, it is estimated that the rolling contact fatigue properties in the radial direction are also satisfactory.

On the contrary, since any one of the requirements of the present invention is not satisfied in the following test Nos., the rolling contact fatigue properties were deteriorated.

Test No. 1 is an example of using a steel material No. 1 in Table 1 having a high C content in the steel, No. 2 is an example of using a steel material No. 2 in Table 1 having a high Mn content in the steel, Test No. 3 is an example of using a steel material No. 3 in Table 1 having a high Cr content in the steel, Test No. 4 is an example of using a steel material No. 4 in Table 1 having a low Cr content in the steel, Test No. 5 is an example of using a steel material No. 5 in Table 1 having a

TABLE 2

| Test No. | Average composition of oxides in steel bar (mass %) Balance: unavoidable impurities | | | | | | Average aspect ratio (major diameter/ minor diameter) | $L_{10}$ life Cycle | Life ratio |
|---|---|---|---|---|---|---|---|---|---|
| | CaO | $Al_2O_3$ | $SiO_2$ | $TiO_2$ | Others | Total | | | |
| 1 | 31.5 | 25.5 | 38.3 | 4.7 | | 100.0 | 1.4 | 1.8E+07 | 1.5 |
| 2 | 28.2 | 31.2 | 34.5 | 6.1 | | 100.0 | 1.4 | 2.1E+07 | 1.8 |
| 3 | 31.0 | 31.0 | 31.8 | 6.2 | | 100.0 | 1.5 | 1.9E+07 | 1.6 |
| 4 | 32.7 | 28.7 | 33.1 | 5.5 | | 100.0 | 1.5 | 1.6E+07 | 1.3 |
| 5 | 29.5 | 32.3 | 33.5 | 4.7 | | 100.0 | 1.6 | 9.0E+06 | 0.8 |
| 6 | 25.2 | 33.0 | 36.7 | 5.1 | | 100.0 | 1.4 | 7.0E+06 | 0.6 |
| 7 | 22.0 | 51.7 | 22.6 | 3.7 | | 100.0 | 1.3 | 2.1E+07 | 1.8 |
| 8 | 20.3 | 47.1 | 25.7 | 6.9 | | 100.0 | 1.3 | 3.1E+07 | 2.6 |
| 9 | 25.3 | 40.2 | 30.2 | 4.3 | | 100.0 | 1.4 | 3.7E+07 | 3.1 |
| 10 | 23.3 | 35.6 | 36.0 | 5.1 | | 100.0 | 1.4 | 4.2E+07 | 3.5 |
| 11 | 25.3 | 27.2 | 43.7 | 3.8 | | 100.0 | 1.7 | 4.5E+07 | 3.8 |
| 12 | 20.2 | 20.9 | 53.4 | 5.5 | | 100.0 | 1.6 | 3.2E+07 | 2.7 |
| 13 | 10.5 | 18.0 | 70.9 | 0.6 | | 100.0 | 3.2 | 1.9E+07 | 1.6 |
| 14 | 53.1 | 21.3 | 21.6 | 4.0 | | 100.0 | 1.3 | 2.1E+07 | 1.8 |
| 15 | 43.1 | 27.2 | 25.6 | 4.1 | | 100.0 | 1.4 | 3.0E+07 | 2.5 |
| 16 | 39.2 | 25.2 | 31.9 | 3.7 | | 100.0 | 1.8 | 4.4E+07 | 3.7 |
| 17 | 26.5 | 26.5 | 42.6 | 4.4 | | 100.0 | 1.6 | 4.3E+07 | 3.6 |
| 18 | 23.2 | 31.2 | 39.8 | 5.8 | | 100.0 | 1.5 | 3.8E+07 | 3.2 |
| 19 | 20.5 | 34.2 | 40.5 | 4.8 | | 100.0 | 1.6 | 3.2E+07 | 2.7 |
| 20 | 19.5 | 41.5 | 35.9 | 3.1 | | 100.0 | 2.1 | 2.0E+07 | 1.7 |
| 21 | 23.7 | 31.1 | 34.0 | 11.2 | | 100.0 | 1.4 | 1.9E+07 | 1.6 |
| 22 | 25.6 | 33.7 | 31.8 | 8.9 | | 100.0 | 1.3 | 4.2E+07 | 3.5 |
| 23 | 27.1 | 27.3 | 41.4 | 4.2 | | 100.0 | 1.8 | 4.4E+07 | 3.7 |
| 24 | 30.3 | 26.5 | 40.0 | 3.2 | | 100.0 | 2.4 | 3.8E+07 | 3.2 |
| 25 | 35.4 | 22.5 | 39.6 | 2.5 | | 100.0 | 5.8 | 2.0E+07 | 1.7 |
| 26 | 28.9 | 33.8 | 31.9 | 5.4 | | 100.0 | 1.4 | 1.1E+07 | 0.9 |
| 27 | 31.1 | 28.7 | 35.0 | 5.2 | | 100.0 | 1.3 | 3.3E+07 | 2.8 |
| 28 | 21.5 | 26.4 | 46.1 | 6.0 | | 100.0 | 1.4 | 3.9E+07 | 3.3 |
| 29 | 28.4 | 27.2 | 37.3 | 7.1 | | 100.0 | 1.3 | 4.4E+07 | 3.7 |
| 30 | 23.7 | 25.1 | 47.9 | 3.3 | | 100.0 | 1.9 | 1.9E+07 | 1.6 |
| 31 | 30.1 | 26.8 | 38.4 | 4.7 | | 100.0 | 1.5 | 3.5E+07 | 2.9 |
| 32 | 33.5 | 30.2 | 31.0 | 5.3 | | 100.0 | 1.4 | 4.5E+07 | 3.8 |
| 33 | 22.5 | 21.5 | 52.5 | 3.5 | | 100.0 | 2.6 | 3.3E+07 | 2.8 |
| 34 | 21.5 | 27.2 | 47.1 | 4.2 | | 100.0 | 1.6 | 4.3E+07 | 3.6 |
| 35 | 27.2 | 32.5 | 34.0 | 6.3 | | 100.0 | 1.4 | 4.6E+07 | 3.8 |
| 36 | 31.5 | 36.0 | 27.1 | 5.4 | | 100.0 | 1.5 | 3.7E+07 | 3.1 |
| 37 | 30.5 | 42.1 | 23.4 | 4.0 | | 100.0 | 1.7 | 3.2E+07 | 2.7 |
| 38 | 29.1 | 48.3 | 17.8 | 4.8 | | 100.0 | 1.6 | 1.6E+07 | 1.3 |
| 39 | 24.5 | 27.2 | 42.8 | 5.5 | | 100.0 | 1.4 | 4.6E+07 | 3.8 |
| 40 | 0.0 | 86.5 | 0.0 | 0.0 | 2.7% MnO 10.8% MgO | 100.0 | 1.3 | 1.2E+07 | 1.0 |

Based on the result, it can be considered as below.

First, since each of test Nos. 8 to 12, 15 to 19, 22 to 24, 27 to 29, 31 to 37, and 39 in Table 2 satisfies the chemical component composition defined in the present invention high P content in the steel, and Test No. 6 is an example of using a steel material No. 6 in Table 1 having a high S content in the steel, and the rolling contact fatigue properties were deteriorated in each of the materials.

Test No. 7 is an example of using a steel grade having excess Al content (steel material No. 7 in Table 1) in which $Al_2O_3$ content in the oxide was increased and the rolling contact fatigue properties were deteriorated.

On the other hand, Test No. 13 is an example of using a steel grade having an insufficient Al content (steel material No. 13 in Table 1) in which each of oxides was out of the range defined in the present invention, in which the aspect ratio of the oxide inclusions was also out of the range and the rolling contact fatigue properties were deteriorated.

Test No. 14 is an example of using a steel grade having a high Ca content (steel material No. 14 in Table 1) in which the CaO content in the oxides was high and the rolling contact fatigue properties were deteriorated.

On the other hand, Test No. 20 is an example of using a steel grade having a low Ca content (steel material No. 20 in Table 1), in which the CaO content in the oxides was low and the rolling contact fatigue properties were deteriorated.

Test No. 21 is an example of using a steel grade having a high Ti content (steel material No. 21 in Table 1) in which the $TiO_2$ content in the oxides was high and the rolling contact fatigue properties were deteriorated.

On the other hand, Test No. 25 is an example of using a steel grades having a low Ti content (steel material No. 25 in Table 1) in which the $TiO_2$ content in the oxides was low, the aspect ratio of the oxide inclusions was also large, and the rolling contact fatigue properties were deteriorated.

Test No. 26 is an example of using a steel grade having a high N content (steel material No. 26 in Table 1) and the rolling contact fatigue properties were deteriorated.

Test No. 30 is an example of using a steel grade having a high O content (steel material No. 30 in Table 1) in which the rolling contact fatigue properties were deteriorated.

For Test No. 38, since the melting time was long in a state where Al concentration was relatively high, oxy-redox reaction between Al in the molten steel and $SiO_2$ in the oxide inclusions proceeded in which the $SiO_2$ content was insufficient and the rolling contact fatigue properties were deteriorated.

Test No. 40 is an example of using a steel grade obtained by the Al deoxidizing treatment (steel material No. 40 in Table 1: existent aluminum-killed steel). Since the Al content was excessive, the $Al_2O_3$ content in the oxides was extremely high, and desired $TiO_2$, etc. were not formed at all, the rolling contact fatigue properties were deteriorated.

While the present invention has been described specifically and with reference to specific embodiments, it will be apparent to a person skilled in the art that various modifications or changes can be made without departing the gist and the scope of the present invention.

The present application is based on Japanese Patent Application filed on Jul. 24, 2012 (Japanese Patent Application No. 2012-163623), the contents of which are incorporated herein for the reference.

INDUSTRIAL APPLICABILITY

According to the present invention, since the chemical component composition of the steel material and the composition of the oxide inclusions contained in the steel are properly controlled, a bearing steel material extremely excellent in the rolling contact fatigue properties and capable of suppressing early peeling could be provided. Such bearing steel material is useful not only as the material for bearing parts such as rollers, needles, and balls to which a load exerts repetitively mainly in the radial direction but is also useful as the material for bearing parts such as races to which a load exerts repetitively in the thrust direction and the rolling contact fatigue properties can be improved stably irrespective of the direction along which the load exerts.

The invention claimed is:
1. A bearing steel material, comprising:
   iron,
   from 0.8 to 1.1 mass % of C,
   from 0.15 to 0.8 mass % of Si,
   from 0.1 to 1.0 mass % of Mn,
   from 1.3 to 1.8 mass % of Cr,
   more than 0 mass % and 0.05 mass % or less of P,
   more than 0 mass % and 0.015 mass or less of S,
   from 0.0002 to 0.005 mass % of Al,
   from 0.0002 to 0.0020 mass % of Ca,
   from 0.0005 to 0.0050 mass % of Ti,
   more than 0 mass % and 0.0080 mass % or less of N, and
   more than 0 mass % and 0.0025 mass % or less of O,
   wherein the steel material comprises oxide inclusions, and
      the oxide inclusions comprise, on the mass % basis,
      from 20 to 50% of CaO,
      from 20 to 50% of $Al_2O_3$,
      from 20 to 70% of $SiO_2$, and
      more than 5% and 10% or less of $TiO_2$.
2. The bearing steel material according to claim 1, wherein an aspect ratio, which is major diameter/minor diameter, of the oxide inclusions present on a surface cross sectioned in parallel to the longitudinal direction of the steel material is restricted to 3.0 or less in average.
3. The bearing steel material according to claim 2, wherein the aspect ratio is 1.0 or more in average.
4. The bearing steel material according to claim 1, which comprises Ti of from 0.0008 to 0.0050 mass %.
5. The bearing steel material according to claim 1, which comprises Ti of from 0.0011 to 0.0050 mass %.
6. The bearing steel material according to claim 1, which comprises Ti of from 0.0005 to 0.0030 mass %.
7. The bearing steel material according to claim 1, which comprises $TiO_2$ of more than 5 mass % and 8 mass % or less.
8. The bearing steel material according to claim 1, which comprises $TiO_2$ of more than 5 mass % and 7 mass % or less.
9. A bearing part comprising the bearing steel material according to claim 1.
10. A bearing part comprising the bearing steel material according to claim 2.
11. A bearing part comprising the bearing steel material according to claim 3.

* * * * *